3,381,717
BLOWN POLYPROPYLENE TUBULAR FILMS
Frederick S. Tyrrel, Fairfield, Conn., assignors to National Distillers and Chemical Corporation, New York, N.Y., a corporation of Virginia
No Drawing. Filed June 3, 1966, Ser. No. 554,985
8 Claims. (Cl. 138—137)

ABSTRACT OF THE DISCLOSURE

Three-ply tubular blown films having two nucleated polypropylene outer layers with an ethylene-vinyl acetate copolymer core.

---

This invention relates to blown polypropylene tubular films, and more particularly to such films constituted of a laminate having optical and mechanical properties superior to those of previously available blown polypropylene tubular films.

In the following specification all parts and percentages are given by weight, unless otherwise indicated.

Blown tubular films are extruded through circular dies, air pressure being employed to expand the extruded film into a continuous tube of any suitable gauge. Segments of such a film may be separated from one another and the ends sealed in bag-making or for other wrapping applications. Unfortunately, the optical and physical properties of previously available polypropylene blown tubular films have been such as to prevent substantial practical application of such materials. Thus, blown polypropylene films of conventional composition possess poor optical clarity as compared with cast polypropylene films of the same composition and cannot, therefore, be utilized for wrapping applications, in which film transparency is an important criterion.

It has previously been proposed to improve the optical, mechanical and physical properties of crystallizable thermoplastic polymeric materials by incorporating small amounts of crystallization nucleating agents in such materials (see, for example, U.S. patent 2,991,264, and "Crystalline Olefin Polymers," Part I, Raff & Doake, Interscience Publishers (1965), pp. 647–676. The use of such nucleating agents in ordinary blown polypropylene films does not, however, overcome the difficulties noted hereinabove. Thus, blown films constituted of propylene homopolymer compositions incorporating nucleating agents possess inferior optical characteristics, i.e., have low gloss and high haze qualities, as compared with similar films composed of polyethylene-nucleating agent compositions. Moreover, such polypropylene films exhibit extreme splittiness (tendency of film to split when subjected to transverse stress) and very low tear strength, even at ordinary ambient temperatures. Similarly, blown films constituted of propylene copolymer compositions incorporating such nucleating agents exhibit relatively poor strength and weak physical properties.

It is accordingly among the objects of the present invention to provide blown polypropylene tubular films having improved optical, mechanical and physical properties.

A particular object of the invention is to provide such a film possessing markedly superior optical clarity, reduced splittiness, and increased tear strength and low temperature impact strength characteristics, as compared with previously known blown polypropylene tubular films.

Other objects and advantages of the invention will be more fully apparent from a consideration of the following description of preferred forms thereof.

The blown polypropylene tubular film of the present invention comprises a laminate having a core constituted of an ethylene-vinyl acetate copolymer and a pair of outer layers laminated to such core, each of which layers is constituted of a propylene polymer in admixture with a nucleating agent in an amount of from about 0.1 to 1.0% by weight of the propylene polymer film composition. It has been found that such laminate possess markedly superior optical clarity and markedly improved mechanical strength and physical properties, as compared with conventional blown polypropylene films. Moreover, the blown polypropylene laminated films hereof are markedly stronger than corresponding films prepared by conventional casting operations. Thus, the tear strength and low temperature impact strength of, e.g., blown polypropylene copolymer laminated films, prepared in accordance with the present invention, are three to four times greater than the corresponding characteristics of homogeneous cast propylene copolymer films of like composition.

It has previously been proposed to utilize ethylene-vinyl acetate copolymer compositions as binding layers for polyolefins and other films (see, for example, U.S. patent 2,543,229). Such material has not, however, previously been utilized in laminates with polypropylene layers containing crystallization nucleating agents to improve the optical, mechanical and physical characteristics of blown tubular films constituted thereof.

The ethylene-vinyl acetate core layer of the laminated films hereof may be formed from mixtures of from about 50 to 90%, preferably from 70 to 85%, ethylene, and from about 10 to 50%, preferably from 15 to 30%, vinyl acetate.

The polypropylene layers laminated to the opposite faces of the ethylene-vinyl acetate core are desirably constituted of a high density polypropylene having a density of from about 0.900. Either propylene homopolymer or, alternatively, copolymers of propylene with up to about 25%, and preferably from about 3 to 25%, of a suitable comonomer, may be so utilized. Materials which may be thus copolymerized with propylene in the formation of the external layers of the laminate of the present invention include ethylene and butylene.

Crystallization of the polypropylene film compositions is effected, as noted above, by the incorporation of a nucleating agent therein. Nucleating agents which may be thus utilized include para-tertiary butyl benzoic acid, aluminum dibenzoate, potassium or sodium benzoate, sodium beta-naphthoate, lithium benzoate, sodium cyclohexane-carboxylate, sodium cycloheptane-carboxylate, sodium succinate, sodium glutarate, sodium caproate, sodium 4-methyl valerate, aluminum phenyl acetate, or sodium cinnamate. Best results have been achieved employing the first eight listed materials, it being particularly preferred to utilize para-tertiary butyl benzoic acid as the nucleating agent incorporated in the polypropylene layers. Desirably, the nucleating agent incorporated in the polypropylene layers has an average particle size of from 5 to 750 millimicrons.

The polypropylene film laminate may be from about 0.8 to 15 mils in thickness, with the ethylene-vinyl acetate core layer having a thickness of from 10 to 80% thereof and each of the polypropylene layers having approximately one-half the remaining thickness. Preferably, the core layer is approximately one-half the total thickness of the laminate with each of the polypropylene outer layers equal to approximately one-quarter of such thickness.

The blown tubular film is prepared in the conventional manner referred to hereinabove, by extruding the blown tubular film from a circular die and inflating the continuously formed tube by means of air pressure. The air is introduced by means of an air needle inserted into the extruded film, the air inflating the film like a bubble and expanding its diameter sufficiently to produce the desired final film gauge. The tubular film may thereafter be sliced into single thicknesses or utilized in continuous lengths, as for bag-forming.

Preferred procedures for the manufacture of the blown polypropylene tubular film of the present invention are described below. It should be understood, however, that the following examples are given as illustrative only.

EXAMPLE I.—BLOWN PROPLYENE COPOLYMER FILM

A laminated blown polypropylene film having a gauge of 0.85 mil was prepared. The laminate core was constituted of a copolymer prepared from an 85% ethylene-15% vinyl acetate monomeric mixture, the copolymer having a 1.5 melt index. An ethylene-vinyl acetate copolymer, commercially available as "Ultrathene UE–630X" from the U.S. Industrial Chemicals Co. division of the assignee of the present invention, was utilized as the core constituent. The laminate outer layers were constituted of a block copolymer of propylene and butylene, having applied slip levels of from 1700 to 3500 parts per million slip. A block copolymer, commercially available as "Escon CD-251" from the Enjay Chemical Corporation, was utilized; alternatively, the similar copolymer available as "Avisun TD–314" from the Avisun Corporation, could be employed. Para-tertiary butyl benzoic acid was incorporated in the polypropylene layers as a nucleating agent, in an amount of 0.6% by weight of the propylene copolymer compositions extruded.

The polypropylene and ethylene-vinyl acetate copolymer compositions were extruded from a circular extruder maintained at a temperature between 400° and 450° F., employing an extruder pressure of approximately 1700 p.s.i. Air was injected into the tubular film thus extruded, employing a blow-up ratio of approximately 2 to 3, to provide the product blown tubular film. Such film possessed good clarity and high tear strength and low temperature impact strength characteristics.

It will be noted that, in accordance with the present invention, a blown polypropylene tubular film has been provided having improved optical, physical and mechanical characteristics, as compared with previously known blown polypropylene tubular films. Since various changes may be made in the preferred embodiments of such films described hereinabove without departing from the scope of the present invention, it should be understood that the preceding description is illustrative only and should not be construed in a limiting sense.

The embodiments of the invention in which an exclusive privilege or property is claimed are defined as follows:

1. A blown polypropylene tubular film, comprising a laminate having a core constituted of an ethylene-vinyl acetate copolymer, and a pair of outer layers laminated to said core, each of said layers constituted of a propylene polymer in admixture with a nucleating agent in an amount of from 0.1 to 1.0% by weight thereof.

2. The blown polypropylene tubular film of claim 1, wherein said nucleating agent is para-tertiary butyl benzoic acid, aluminum dibenzoate, potassium, sodium or lithium benzoate, sodium beta-naphthoate, sodium cyclohexanecarboxylate, sodium cycloheptanecarboxylate, sodium succinate, sodium glutarate, sodium caproate, sodium 4-methyl valerate, aluminum phenyl acetate, or sodium cinnamate.

3. The blown polypropylene tubular film of claim 1, wherein said nucleating agent consists essentially of tertiary butyl benzoic acid having an average particle size of from 5 to 750 millimicrons.

4. The blown polypropylene tubular film of claim 1, wherein the propylene polymer is a high density polypropylene homopolymer having a density of about 0.900.

5. The blown polypropylene tubular film of claim 1, wherein the propylene polymer is a copolymer of propylene with ethylene or butylene, the propylene constituting from 75 to 97% by weight of the monomeric constituents of said copolymer.

6. The blown polypropylene tubular film of claim 1, wherein ethylene constitutes from 50 to 90% by weight of the ethylene-vinyl acetate monomeric constituents of the ethylene-vinyl acetate copolymer core of said laminate.

7. The blown polypropylene tubular film of claim 1, wherein said laminate has a thickness of from 0.8 to 15 mils and in which each of the propylene polymer outer layers of said laminate has a thickness equal to from 10 to 45% of the overall thickness thereof.

8. The blown polypropylene tubular film of claim 1, wherein said laminate has a thickness of from 0.8 to 15 mils and incorporates a core constituted of an ethylene-vinyl acetate copolymer, ethylene constituting from 70 to 80% by weight of the monomeric constituents of said copolymer; and a pair of outer layers laminated to said core, each of said layers having a thickness of from 10 to 45% of the overall thickness of the laminate and being constituted of a copolymer of propylene and butylene, in admixture with from 0.1 to 1.0% by weight of a para-tertiary butyl benzoic acid nucleating agent.

References Cited

UNITED STATES PATENTS 3,184,358   5/1963   Utz _____ 156—244
3,207,737   9/1965   Wales _____ 260—93.7

EARL M. BERGERT, *Primary Examiner.*

W. E. HOAG, *Assistant Examiner.*